United States Patent [19]
Kono et al.

[11] Patent Number: 6,007,870
[45] Date of Patent: Dec. 28, 1999

[54] PROCESS FOR PREPARING CERAMIC POWDER

[75] Inventors: Yasuhisa Kono; Kenji Saito; Yoichi Mizuno; Hirokazu Chazono, all of Tokyo, Japan

[73] Assignee: Taiyo Yuden Co., Ltd., Tokyo, Japan

[21] Appl. No.: 09/118,820

[22] Filed: Jul. 20, 1998

[30] Foreign Application Priority Data

Jul. 31, 1997 [JP] Japan .................................. 9-219982

[51] Int. Cl.$^6$ ...................................................... B05D 7/00
[52] U.S. Cl. ......................... 427/215; 427/212; 427/309; 427/398.1
[58] Field of Search ................................ 427/212, 213.3, 427/213.31, 215, 309, 398.1; 423/605, 592; 23/301

[56] References Cited

U.S. PATENT DOCUMENTS

| | | | |
|---|---|---|---|
| 3,490,927 | 1/1970 | Kahn et al. | 106/39 |
| 5,055,434 | 10/1991 | Thometzek et al. | 501/127 |

FOREIGN PATENT DOCUMENTS

| | | | |
|---|---|---|---|
| 0 357 959 | 3/1990 | European Pat. Off. | C01G 20/00 |
| 62-3005 | 1/1987 | Japan | C01B 13/36 |
| 62-139801 | 6/1987 | Japan | B22F 1/02 |
| 62-143861 | 6/1987 | Japan | C04B 35/00 |

OTHER PUBLICATIONS

Zumdahl, Steven S., "Chemistry", D.C. Health and Company, Lexington, MA, pp. 484–486, 1989.

*Primary Examiner*—Shrive Beck
*Assistant Examiner*—Paul D. Strain
*Attorney, Agent, or Firm*—Snider & Associates; Ronald R. Snider

[57] ABSTRACT

The process for preparing ceramic powder having a core-shell structure by dissolving a crystalline ceramic powder in water so as to leave a core portion of the ceramic powder while heating; depositing a component of the ceramic powder dissolved in the water on and around surfaces of the core portion thereof as a deposited material from the water by gradually cooling the ceramic powder and the water obtained in the step of dissolving; and firing a mixture of the ceramic powder obtained in the step of depositing with an additive at a high temperature to subject the deposited material and the additive to solid phase reaction to form a shell portion on and around the core portion of the ceramic powder. The process can produce the ceramic powder having a core-shell structure from a crystalline ceramic powder, thereby achieving high electrical and mechanical features when formed into ceramic electronic parts.

On the other hand, conventional ceramic electronic parts produced from highly crystalline ceramic powder raise the manufacturing cost because such ceramic powder is low in reactivity so that it requires high firing temperature. Ceramic powder in a core-shell structure produced from low-crystalline ceramic powder results to conventional ceramic electronic parts which are poor in electrical and mechanical characteristics.

3 Claims, No Drawings

PROCESS FOR PREPARING CERAMIC POWDER

CROSS-REFERENCE

This application claims the priority of Japanese Patent Application No. H9-219982, filed on Jul. 31, 1997, which is incorporated herein by reference.

BACKGROUND OF THE INVENTION

1. Field of the Invention

The present invention relates to a process for preparing ceramic powder and, more particularly, to a process for preparing ceramic powder in a core-shell structure.

2. Description of the Related Art

As ceramic electronic parts have recently been developed so as to make their sizes smaller and smaller and to make their quality higher and higher, a variety of materials have also been developed so as to catch up with such development. Under such technical background, ceramic powder having a core-shell structure is now being highlighted as a material for ceramic electronic parts.

Such ceramic powder having a core-shell structure is configured in such a manner that it comprises a highly crystalline core portion and a shell portion formed on and around the core portion and composed of a different composition material. The such ceramic powder can smooth temperature features of a ceramic condenser when it is used as a dielectric material.

The ceramic powder with such a core-shell structure can be produced, for instance, by admixing ceramic powder with an additive and firing the resulting mixture at a high temperature to thereby subject it to solid phase reaction to allow the additive to be formed on and around surfaces of the ceramic powder.

Further, it is favorable if ceramic powder having a core-shell structure could be produced from highly crystalline ceramic powder because such a highly crystalline ceramic powder has good electrical features such as dielectric constant and so on. The highly crystalline ceramic powder, however, has the drawbacks that it is so low in reactivity that a considerably high temperature is required to cause an occurrence of solid phase reaction, resulting to a rise in manufacturing cost.

On the other hand, a low-crystalline ceramic powder can produce ceramic powder with a core-shell structure because it can readily be subjected to solid phase reaction by firing it at a lower temperature. Such a low-crystalline ceramic powder, however, presents the drawbacks that ceramic electronic parts prepared therefrom may result in poor electrical and mechanical characteristics.

SUMMARY OF THE INVENTION

Therefore, the present invention has the object to provide a process for preparing ceramic powder with a core-shell structure having good electrical and mechanical features by firing ceramic powder at a lower temperature.

In order to achieve the object, the present invention provides a process for preparing ceramic powder, which comprises the step of dissolving a crystalline ceramic powder in water so as to leave a core portion of the ceramic powder while heating; the step of depositing a component of the ceramic powder dissolved in the water on and around surfaces of the core portion thereof as a deposited material from the water by gradually cooling the ceramic powder and the water obtained in the step of dissolving; and the step of firing a mixture of the ceramic powder obtained in the step of depositing with an additive at a high temperature to subject the deposited material and the additive to solid phase reaction to form a shell portion on and around the core portion of the ceramic powder Other objects, features and advantages of the present invention will become apparent in the course of the description which follows.

DESCRIPTION OF THE PREFERRED EMBODIMENTS

The process in accordance with the present invention can provide ceramic powder having a core-shell structure by dissolving a crystalline ceramic powder in water so as to leave a core portion of the ceramic powder while heating; depositing a component of the ceramic powder dissolved in the water on and around surfaces of the core portion thereof as a deposited material from the water by gradually cooling the ceramic powder and the water obtained in the step of dissolving; and firing a mixture of the ceramic powder obtained in the step of depositing with an additive at a high temperature to subject the deposited material and the additive to solid phase reaction to form a shell portion on and around the core portion of the ceramic powder.

The ceramic powder to used for the present invention may include, for example, barium titanate powder, barium titanate zirconate powder, lead titanate zirconate powder or lead titanate powder, although the ceramic powder to be used for the present invention is not restricted to those specifically stated above.

As the crystalline ceramic powder to be used for the present invention, there may be preferably mentioned, for example, one synthesized by hydrothermal method. It is to be noted herein, however, that the crystalline ceramic powder is not restricted to the one as stated above and any other ceramic powder produced by different methods may also be used as long as it is crystalline.

In accordance with the process of the present invention, it is preferred that the ceramic powder and water are heated at temperature ranging from approximately 80° C. to 120° C. In this case, a speed of dissolving the ceramic powder in water can be facilitated by heating the ceramic powder and water under elevated pressure. It is to be noted herein that the duration of heating the ceramic powder can exert the effect upon the thickness of the shell portion of the ceramic powder. When the ceramic powder is heated for a longer time, on the one hand, the shell portion can be made thicker. When the ceramic powder is heated for a shorter time, on the other, the thickness of the shell portion may become thinner.

It is further preferred that the mixture of the ceramic powder with water is gradually cooled at the rate of approximately 2° C. to 20° C. per hour. If the speed of gradually cooling the mixture at the rate of lower than 2° C., on the one hand, it will take a too long time to cool the mixture. If the mixture is cooled at the rate of greater than 20° C., on the other, the component of the ceramic powder dissolved in the water may not be deposited on and around surfaces of the core portion thereof as the deposited material to a sufficient extent. It is to be noted herein that, as the deposited material has a hydroxyl group, a water content or voids resulting from pores, the reactivity of the deposited material with the additive is considered to be high.

Further, the additive to be used for the present invention may preferably include, for example, $Nb_2O_5$, $Co_3O_4$, $MnO_2$, $Ta_2O_5$ or $VO_5$, although the additive is not restricted to those stated hereinabove and any other additive can also be used as long as it can achieve the effects sought to be attained by the present invention.

The present invention will be described in more detail by way of examples.

EXAMPLE 1

Into an autoclave were placed 100 grams of highly crystalline barium titanate powder having an average particle size of 0.5 micron, synthesized by hydrothermal method, and 200 ml of purified water, and the autoclave was closed in airtight way. The resulting mixture was heated at temperature ranging from 80° C. to 100° C. for 5 to 10 hours, as indicated as Sample Nos. A to D in Table below, thereby allowing surfaces of particles of barium titanate powder to be dissolved gradually in the purified water.

Then, the autoclave was gradually cooled to below 50° C. by lowering the temperature of the autoclave at the rate of 2° C. to 20° C. per hour, as indicated in Table below.

To the resulting slurry of barium titanate powder obtained at 50° C. was then added 1.14 gram of Nb2O5 and the resulting mixture was mixed with 5 mm φ ZrO2 beads for 1 hour.

The resulting slurry was then filtered yielding a cake that in turn was dried at 110° C. for 24 hours, followed by firing it at 1,100° C. for 5 hours in the atmosphere to give ceramic powder.

The resulting ceramic powder was then analyzed with XRD. As a result, the shift of a peak at 45.26° (CuK α) indicating the extent of solid solution of Nb into barium titanate is as shown in Table below.

Further, the resulting ceramic powder was measured for its dielectric constant and the results are shown as Sample Nos. A to D in Table below.

COMPARATIVE EXAMPLE 1

A mixture of 100 grams of highly crystalline barium titanate powder having an average particle size of 0.5 micron, as used in Example 1 above, with 0.5 gram of Nb2O5 was admixed intact with each other and fired at 1,100° C. for 3 hours. The resulting ceramic powder was then analyzed with XRD. As a result, the shift of a peak was observed at 45.26° (usual solid reaction) is as shown in Table below. Further, as shown in Table below, the resulting ceramic powder was found to have its dielectric constant of 2,310.

TABLE

| Sample | | Material | Heating Temp. (° C.) | Heating Hour (hrs) | Lowering Rate (° C./hr) | Shift Of Peak | Dielectric Constant ε |
|---|---|---|---|---|---|---|---|
| Comparative Ex #1 | | Barium titanate | — | — | — | 45.26° | 2310 |
| Example #1 | A | Barium titanate | 80 | 5 | 2 | 45.26° ± 0.19° | 2813 |
| | B | Barium titanate | 100 | 5 | 2 | 45.26° ± 0.24° | 2903 |
| | C | Barium titanate | 80 | 10 | 2 | 45.26° ± 0.22° | 2755 |
| | D | Barium titanate | 80 | 5 | 20 | 45.26° ± 0.07° | 2844 |

From the results as shown in Table above, it is found that the ceramic powder prepared in Example 1 has the thick shell portion formed on and around the core portion having a high crystallinity when the extent of the shift of the peak at 45.26° (CuK α) taken into account, as compared with the ceramic powder obtained in Comparative Example 1.

Further, the ceramic powder obtained in Comparative Example 1 had the dielectric constant at 2,310 while the ceramic powder obtained in Example 1 had the dielectric constant in the range of from 2,755 to 2,903. This means that the dielectric constant of the ceramic powder according to the present invention is considerably higher than that of Comparative Example 1.

EXAMPLES 3–5

The procedures were carried out in substantially the same manner as in Example 1 with the exception that barium titanate zirconate powder, lead titanate zirconate powder or lead titanate powder was used, respectively, in place of barium titanate powder.

As a result, it was found that substantially the same results were gained as in Example 1 above.

EXAMPLES 6–8

The procedures were conducted in substantially the same manner as in Example 1 with the exception that MnO2, Ta2O5 or VO5, was used as an additive, respectively, in place of Nb2O5.

As a result, it was found that substantially the same results were gained as in Example 1 above.

EFFECTS OF THE INVENTION

The present invention can provide the effects that the ceramic powder having an ideal core-shell structure, that is, the ceramic powder having high electrical and mechanical features, particularly high temperature features, can be prepared at a relatively low temperature and at low manufacturing cost.

What is claimed is:

1. A process for preparing ceramic powder, comprising:

the step of dissolving a crystalline ceramic powder in water so as to leave a core portion of the ceramic powder while heating;

the step of depositing a coating of the ceramic powder dissolved in the water on and around surfaces of the core portion thereof as a deposited material from the water by gradually cooling the ceramic powder and the water obtained in the step of dissolving, wherein said coating consists of said ceramic powder or said ceramic powder and an additive selected from the group consisting of $Nb_2O_5$, $Co_3O_4$, $MnO_2$, $Ta_2O_5$, and $VO_5$; and the step of firing a mixture of the ceramic powder obtained in the step of depositing at a high temperature to subject the deposited material to solid phase reaction to form a shell portion on and around the core portion of the ceramic powder.

2. The process for preparing the ceramic powder as claimed in claim 1, wherein said ceramic powder is heated with water under elevated pressure.

3. The process for preparing the ceramic powder as claimed in claim 1, wherein said ceramic powder is barium titanate powder, barium titanate zirconate powder, lead titanate zirconate powder or lead titanate powder.

* * * * *